Patented Aug. 22, 1950

2,519,573

UNITED STATES PATENT OFFICE 2,519,573

PRODUCTION OF AMINO ACIDS AND SALTS

Forest A. Hoglan, Toledo, Ohio, assignor to International Minerals and Chemical Corporation, a corporation of New York No Drawing. Application June 30, 1947, Serial No. 758,221

12 Claims. (Cl. 260—501)

The present invention relates to the production of inorganic salts, betaine, and glutamic acid. More particularly this invention relates to the production of inorganic sulfate salts, betaine hydrochloride, and glutamic acid from Steffen's filtrate.

It is known that Steffen's filtrate, which is a dilute solution of waste products resulting from the de-sugarization of sugar beet solutions, contains various chemical components including inorganic salts of sodium and potassium, small quantities of sugars, and varying amounts of glutamic acid mother substances and free glutamic acid or glutamic acid salts. It has previously been proposed to recover the inorganic salts, betaine salts and glutamic acid from Steffen's filtrate by means of several different procedures. For example, Steffen's filtrate is concentrated to a specific gravity between 1.2 and 1.4 and a concentrated mineral acid such as hydrochloric or sulfuric is added in order to precipitate inorganic salts and betaine salts. The filtrate which results from removal of these salts is then hydrolyzed, usually under acidic conditions, in order to liberate glutamic acid from the glutamic acid mother substances. By adjusting the pH of the hydrolysate to approximately 3.2, glutamic acid is crystallized from the solution, usually in an impure form. The various processes previously employed usually involve the co-precipitation of inorganic salts and betaine salts, and separation of the betaine or betaine salts from the inorganic salts is only accomplished by employing various and numerous recrystallization procedures usually involving the use of organic solvents such as methyl alcohol. If the inorganic salts and betaine salts are not initially co-precipitated from Steffen's filtrate with acid, a major portion of the inorganic salts is initially precipitated with a mineral acid after which the filtrate is subjected to hydrolysis, usually under acidic conditions, to produce glutamic acid. Betaine salt is subsequently recovered from the hydrolysate either before crystallization of glutamic acid or subsequent to this step. In either procedure, the betaine salt crystallizes together with appreciable quantities of inorganic salts and/or glutamic acid or glutamic acid salts, thereby rendering both products impure and necessitating further purification operations. Since betaine and glutamic acid are present, together with inorganic salts, in varying quantities in a hydrolyzed Steffen's filtrate, it is advantageous to separate these materials individually in a relatively high state of purity.

It is an object of this invention to produce betaine hydrochloride, in a high state of purity from Steffen's filtrate, from which inorganic salts have previously been removed.

A further object of the invention is to produce inorganic sulfate salts from Steffen's filtrate said salts being substantially free from betaine salts and glutamic acid.

It is a further object of the invention to provide an improved and commercially feasible process for the production from Steffen's filtrate of inorganic sulfate salts, betaine salts, and glutamic acid which results in the recovery of these compounds individually in a relatively high state of purity.

These objects as well as others which will become apparent upon a fuller understanding of the invention are accomplished by employing the herein described novel process which in general comprises treating Steffen's filtrate, from which a substantial amount of inorganic salts has been previously removed, with aqueous or anhydrous HCl. Betaine hydrochloride is allowed to crystallize from the solution and is recovered therefrom. The resultant solution is subjected to hydrolysis under controlled conditions in order to liberate glutamic acid from the glutamic acid mother substances which are present in Steffen's filtrate and glutamic acid is recovered from the hydrolysate.

More particularly, the novel process herein disclosed comprises treating Steffen's filtrate, which has preferably been concentrated to a specific gravity between about 1.2 and about 1.4, with aqueous or anhydrous HCl to give a pH between about 0.2 and about 1.0 after having previously removed inorganic salts from the Steffen's filtrate by means of sulfuric acid. Betaine hydrochloride crystallizes from the solution preferably at a temperature between about 0° C. and about 35° C., and is removed therefrom. The resultant solution is subjected to hydrolysis, preferably under acidic conditions with a non-oxidizing mineral acid such as hydrochloric acid, in order to hydrolyze the glutamic acid mother substances. The pH of the hydrolysate is adjusted to about 1.6 with an inorganic alkaline compound, after which insoluble material and any salts which may crystallize from the solution are separated therefrom. The adjusted hydrolysate is concentrated at least to a point where incipient crystallization of salts may occur and said salts are crystallized and removed from the concentrate, preferably at a temperature between about 40° C. and about 60° C. The pH of the resultant solution is adjusted with an alkaline compound to about 3.2, and glutamic acid is crystallized and recovered therefrom.

It will be understood that in the step of the process which involves treating Steffen's filtrate to produce betaine hydrochloride that either aqueous or anhydrous HCl may be employed.

In a preferred embodiment of the invention, Steffen's filtrate, preferably concentrated to a specific gravity between about 1.2 and about 1.4, is treated with sulfuric acid to give a pH of between about 2.0 and about 2.9, and preferably a pH of about 2.7. While concentrated sulfuric acid (about 95% $H_2SO_4$) is preferably employed in this step, more dilute solutions of sulfuric acid can also be used. Such dilute sulfuric acid solutions are usually avoided as their use involves the dilution of the Steffen's filtrate which is undesirable since the solutions must be concentrated for subsequent steps in the process in order to achieve crystallization of betaine hydrochloride. The temperature of the Steffen's filtrate is not permitted to exceed 70° C. during the addition of the sulfuric acid. The sulfuric acid treated Steffen's filtrate is allowed to cool to a temperature between about 0° C. and about 50° C. and the inorganic sulfate salts, in particular sodium and potassium sulfate, are crystallized and separated therefrom. This separation of salts may be accomplished by any suitable means, for example with a filter press or basket centrifuge.

The resultant filtrate is then concentrated to between about 50% and about 90% of the weight of the original Steffen's filtrate, said concentration depending upon the viscosity of the solution and upon the amount of available betaine. The concentrated solution is then treated with anhydrous HCl or concentrated hydrochloric acid (about 37% HCl) at a temperature not greater than 70° C. to give a pH of between about 0.2 and about 1.0, and preferably a pH of about 0.6. Since dilution of the solution with water is undesirable for the reasons previously mentioned, it is preferable to use either gaseous HCl or concentrated hydrochloric acid with an HCl content approximately as previously stated. However, more dilute hydrochloric acid may be employed provided that the resulting solution be concentrated to a further degree in order to achieve crystallization of betaine hydrochloride. The HCl treated solution is cooled to a temperature between about 0° C. and about 35° C., preferably to about 20° C., in order to crystallize betaine hydrochloride therefrom. The removal of betaine hydrochloride may be accomplished by any suitable means, for example by employing a filter or basket type centrifuge.

The resultant filtrate is then hydrolyzed, usually under acidic conditions. Concentrated hydrochloric acid (about 37% HCl) is preferably employed in the hydrolysis step at a temperature between about 100° C. and about 125° C., for a period of between about ¼ and about 4 hours. The pH of the hydrolysate is adjusted to about 1.6 by means of a suitable inorganic alkaline compound, for example sodium hydroxide, potassium hydroxide, ammonium hydroxide, etc. The adjusted hydrolysate may either be filtered in order to remove insoluble organic matter and salts which may crystallize at this step in the process, or it may be concentrated directly to a point at which crystallization of salts occurs. Usually a concentration to between about 55% and about 90% of the weight of the original Steffen's filtrate will suffice. The concentrated hydrolysate is then cooled to a temperature between about 40° C. and about 60° C. and inorganic salts are crystallized and separated therefrom. The pH of the resultant solution is then adjusted to about 3.2 by means of a suitable organic or inorganic alkaline reagent such as those previously described. Preferably this pH adjustment is accomplished with anhydrous ammonia, for the reason that the solution is not thereby further diluted with water and also because the ammonium salts are, in general, more soluble in the glutamic acid liquor than are the corresponding sodium or potassium salts, and the subsequently crystallized glutamic acid will be less contaminated with inorganic salts. The solution of glutamic acid at a pH of about 3.2 is allowed to stand for several days in order to permit crystallization of glutamic acid. The product is separated from the solution by suitable means, for example, by employing a basket-type centrifuge. The product may either be dried directly or may be repulped with about 60% by weight of water in order to remove residual inorganic salts. The purity of the repulped glutamic acid is between about 90% and about 95% and may be converted directly into monosodium glutamate by neutralization with one equivalent of an alkaline reagent such as sodium hydroxide, sodium carbonate or sodium bicarbonate. Monosodium glutamate is valuable in the food industry as a flavoring material.

The Steffen's filtrate hydrolysate which is prepared, as described above, subsequent to the removal of inorganic sulfates and betaine hydrochloride may be processed according to several modifications of the above described novel process. For example, insoluble organic material and salts may be separated directly from the hydrolysate after which the pH of said hydrolysate is adjusted to about 1.6 as previously described. The adjusted hydrolysate is then concentrated at least to the point of incipient crystallization of salts. The hydrolysate may also be concentrated directly after pH adjustment to about 1.6 at least to the point of incipient crystallization of salts, and said salts removed together with insoluble organic material. The purity of the glutamic acid produced according to either procedure is approximately the same.

Although hydrolysis of the Steffen's filtrate, from which inorganic sulfate salts and betaine hydrochloride have previously been removed, is usually accomplished by means of acid reagents such as hydrochloric acid, sulfuric acid, phosphoric acid, etc., the hydrolysis may also be conducted by means of various alkaline reagents, for example sodium hydroxide and/or calcium oxide or hydroxide. If an alkaline hydrolysis is desired, preferably not more than 10.0% of the reagent, based on the weight of the Steffen's filtrate, is used, and the temperature during the hydrolysis is maintained below 100° C., and preferably at about 85° C. Usually about two hours will suffice to convert the glutamic mother substances into glutamic acid. The pH of the alkaline hydrolysate is adjusted to about 1.6 with a suitable acidic reagent, for example concentrated hydrochloric acid, sulfuric acid or phosphoric acids. The subsequent removal of inorganic salts, pH adjustment to about 3.2 and recovery of glutamic acid are substantially the same as described when employing minerals acid reagents such as HCl or hydrochloric acid.

In a further embodiment of the invention the acid hydrolysate, from which inorganic sulfate salts and betaine hydrochloride have previously been removed, is treated with an alkaline Steffen's filtrate hydrolysate prepared as described above, while avoiding conditions conducive to the precipitation of substantial amounts of glutamic acid. Preferably, sufficient alkaline hydrolysate is added to the acid hydrolysate to give a pH of about 1.6. The subsequent removal of insoluble material and inorganic salts, pH adjustment to about 3.2 and recovery of glutamic acid are substantially the same as described where acid hydrolysis is employed. The purity of the glutamic acid product is between about 90% and about 95%.

In order to afford a more complete description of the invention, but with no intention of being limited thereby, the following example is given:

About 1,000 parts by weight of Steffen's filtrate (specific gravity about 1.32 at 24° C.) is treated with concentrated sulfuric acid (about 95% $H_2SO_4$) while maintaining the temperature of the solution below 70° C. to give a pH of about 2.7. The resultant solution is cooled to a temperature between about 20° C. and about 50° C. and is allowed to stand for several hours in order to permit crystallization of the potassium and sodium sulfate salts. These salts are removed by filtration and the resultant solution is concentrated to about 60% of the weight of the original Steffen's filtrate. Preferably this concentration is conducted in vacuo. The concentrated solution is then treated with a sufficient amount of concentrated hydrochloric acid (about 37% HCl) at a temperature not greater than 70° C. to reduce the pH of the solution to about 0.6. Usually an amount of concentrated hydrochloric acid between about 125 parts and about 150 parts will suffice. The solution is cooled to a temperature between about 0° C. and about 35° C. in order to crystallize betaine hydrochloride. The solution is allowed to stand for several hours and the crystallized betaine hydrochloride is separated therefrom by means of a filter. The purity of the betaine hydrochloride is usually 90% or higher and the yield of dried product is between about 5.0% and about 10.0% by weight of the original Steffen's filtrate. To the resultant filtrate is added between about 175 parts and about 250 parts by weight of hydrochloric acid (about 37% HCl) and the solution is heated at a temperature between about 100° C. and about 125° C. in order to hydrolyze the glutamic acid mother substances. The hydrolysate is cooled to about 30° C. and is neutralized to a pH of about 1.6 with a 50% solution of sodium hydroxide. Usually between about 175 parts and about 225 parts by weight of said sodium hydroxide solution will be sufficient. The adjusted hydrolysate is filtered in order to remove inorganic salts and insoluble material, and the filtrate is concentrated to approximately 90% of the weight of the original Steffen's filtrate. The concentrated solution is cooled to a temperature between about 40° C. and about 60° C. and inorganic salts are crystallized and separated therefrom. The pH of the resultant filtrate is adjusted to about 3.2 with ammonia and the solution allowed to stand for several days in order to permit crystallization of glutamic acid therefrom. The product is removed by filtration and is preferably repulped with about 60% by weight of water in order to remove residual inorganic salts. The purity of the glutamic acid is between about 90% and about 95%.

Obviously the invention is not limited to the procedural details stated herein but may be carried out by obvious extensions and modifications of the factors recited.

What is desired to be secured by Letters Patent is:

1. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0 and separating a solid composition comprising essentially betaine hydrochloride therefrom.

2. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution and recovering glutamic acid from the hydrolysate.

3. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution with a non-oxidizing mineral acid and recovering glutamic acid from the hydrolysate.

4. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution with a non-oxidizing mineral acid, separating insoluble material therefrom, adjusting the pH of the resultant solution to about 1.6, separating salts, adjusting the pH of the resultant solution to about 3.2 and recovering glutamic acid therefrom.

5. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution with a non-oxidizing mineral acid, adjusting the pH of the hydrolysate to about 1.6, concentrating the resultant solution at least to the point of incipient crystallization of salts, separating said salts and insoluble material, adjusting the pH of the resultant solution to about 3.2 and recovering glutamic acid therefrom.

6. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution with a non-oxidizing mineral acid, separating insoluble material therefrom, adjusting the pH of the resultant solution to about 1.6, concentrating said solution at least to the point of incipient crystallization of salts, crystallizing and separating said salts, adjusting the pH of the resultant solution to about 3.2 and recovering glutamic acid therefrom.

7. The process which comprises treating Steffen's filtrate with sulfuric acid under nonhydrolyzing conditions to give a pH between about 2.0 and about 2.9, separating inorganic sulfates therefrom, concentrating the resultant solution to between about 50 and about 90 per cent of the weight of the original Steffen's filtrate, treating said concentrate with hydrochloric acid to give a pH between about 0.2 and about 1.0, separating a solid composition comprising essentially betaine hydrochloride therefrom, hydrolyzing the resultant solution with a non-oxidizing mineral acid, separating insoluble material from the hydrolysate, adjusting the pH of the resultant solution to about 1.6, separating salts, adjusting the pH of the resultant solution to about 3.2, and recovering glutamic acid therefrom.

8. The process which comprises treating concentrated Steffen's filtrate with sulfuric acid of about 95% at a temperature not greater than 70° C. to give a pH of about 2.7, separating inorganic sulfates therefrom, concentrating the resultant solution to between about 50 and about 90 per cent of the weight of the original Steffen's filtrate, treating said concentrate with hydrochloric acid of about 37% to give a pH of about 0.6, crystallizing and separating a solid composition comprising essentially betaine hydrochloride therefrom, hydrolyzing the resultant solution with hydrochloric acid of about 37% at a temperature between about 100° C. and about 125° C., separating insoluble material from the hydrolysate, adjusting the pH of the clarified hydrolysate to about 1.6 with an inorganic alkaline compound, concentrating the resultant solution at least to the point of incipient crystallization of salts, crystallizing and separating said salts, adjusting the pH of the resultant solution to about 3.2 and recovering glutamic acid therefrom.

9. The process which comprises treating concentrated Steffen's filtrate with sulfuric acid of about 95% at a temperature not greater than 70° C. to give a pH of about 2.7, crystallizing and separating inorganic sulfates therefrom at a temperature between about 0° C. and about 50° C., concentrating the resultant solution to between about 50% and about 90% of the weight of the original Steffen's filtrate, treating said concentrate with hydrochloric acid of about 37% at a temperature not greater than 70° C. to give a pH of about 0.6, crystallizing and separating a solid composition comprising essentially betaine hydrochloride therefrom at a temperature between about 0° C. and about 35° C., hydrolyzing the resultant solution with hydrochloric acid of about 37% at a temperature between about 100° C. and about 125° C., adjusting the pH of the hydrolysate to about 1.6 with a solution of sodium hydroxide, separating insoluble material therefrom, concentrating the resultant solution to between about 55% and about 90% of the weight of the original Steffen's filtrate, crystallizing and separating salts therefrom at a temperature between about 40° C. and about 60° C., adjusting the pH of the resultant solution to about 3.2 with ammonia and recovering glutamic acid therefrom.

10. The process which comprises treating about one thousand parts by weight of concentrated Steffen's filtrate with sulfuric acid of about 95% at a temperature not greater than 70° C. to give a pH of about 2.7, crystallizing and separating inorganic sulfates therefrom at a temperature between about 0° C. and about 50° C., concentrating the resultant solution to about 60 per cent of the weight of the original Steffen's filtrate, treating said concentrate with between about 125 parts and about 150 parts by weight of hydrochloric acid of about 37% at a temperature not greater than 70° C. to give a pH of about 0.6, crystallizing and separating a solid composition comprising essentially betaine hydrochloride therefrom at a temperature of between about 20° C. and about 30° C., hydrolyzing the resultant solution with between about 175 parts and about 250 parts by weight of hydrochloric acid of about 37% at a temperature between about 100° C. and about 125° C., adjusting the pH of the hydrolysate to about 1.6 with between about 175 parts and about 225 parts by weight of a 50 per cent solution of sodium hydroxide, separating insoluble material and salts therefrom, concentrating the resultant solution to between about 55 and about 90 per cent of the weight of the original Steffen's filtrate, crystallizing and separating salts therefrom at a temperature between about 40° C. and about 60° C., adjusting the pH of the resultant solution to about 3.2 with ammonia and recovering glutamic acid therefrom.

11. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution with a non-oxidizing mineral acid, combining the acid hydrolysate with an alkaline hydrolysate of Steffen's filtrate while avoiding conditions conducive to the precipitation of substantial amounts of glutamic acid, separating salts from the co-neutralized hydrolysates, adjusting the pH of the resultant solution to about 3.2 and recovering glutamic acid therefrom.

12. The process which comprises treating Steffen's filtrate with sulfuric acid under nonhydrolyzing conditions to give a pH between about 2.0 and about 2.9, separating inorganic sulfates therefrom, treating the resultant solution with hydrochloric acid to give a pH between about 0.2 and about 1.0, separating a solid composition comprising essentially betaine hydrochloride therefrom, hydrolyzing the resultant solution with a non-oxidizing mineral acid, combining the acid hydrolysate with an alkaline hydrolysate of Steffen's filtrate to give a pH of about 1.6, separating insoluble material from the co-neutralized hydrolysates, concentrating the resultant solution at least to the point of incipient crystallization of salts, crystallizing and separating said salts therefrom, adjusting the pH of the resultant solution to about 3.2 and recovering glutamic acid therefrom.

FOREST A. HOGLAN.

REFERENCES CITED

The following references are of record in the file of this patent:

UNITED STATES PATENTS

| Number | Name | Date |
| --- | --- | --- |
| 761,412 | Schrader | May 31, 1904 |
| 1,634,221 | Tressler | June 28, 1927 |
| 1,634,222 | Tressler | June 28, 1927 |
| 1,681,379 | Takayama | Aug. 21, 1928 |
| 1,721,820 | Ikeda | July 23, 1929 |
| 1,844,929 | Bromig | Feb. 16, 1932 |
| 1,870,319 | Takayama | Aug. 9, 1932 |
| 1,947,563 | Masuda et al. | Feb. 20, 1934 |